(12) United States Patent
Cleveland et al.

(10) Patent No.: US 9,882,497 B2
(45) Date of Patent: Jan. 30, 2018

(54) SOFT SWITCHING SYNCHRONOUS QUASI RESONANT CONVERTER

(71) Applicant: Microchip Technology Incorporated, Chandler, AZ (US)

(72) Inventors: Terry L. Cleveland, Endicott, NY (US); Jeffrey L. Dann, Marathon, NY (US); Scott Dearborn, Brackney, NY (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 368 days.

(21) Appl. No.: 14/038,199

(22) Filed: Sep. 26, 2013

(65) Prior Publication Data
US 2014/0092646 A1    Apr. 3, 2014

Related U.S. Application Data

(60) Provisional application No. 61/707,506, filed on Sep. 28, 2012.

(51) Int. Cl.
*H02M 3/335* (2006.01)
*H05B 33/08* (2006.01)
*H02M 1/00* (2006.01)

(52) U.S. Cl.
CPC ..... *H02M 3/3353* (2013.01); *H02M 3/33592* (2013.01); *H05B 33/0815* (2013.01);
(Continued)

(58) Field of Classification Search
CPC ........... H02M 3/3353; H02M 3/33592; H02M 3/33576; H02M 3/33561; H02M 3/33523; Y02B 70/1475
See application file for complete search history.

(56) References Cited

U.S. PATENT DOCUMENTS 5,568,016 A    10/1996    Beard .................. 315/169.3
5,991,172 A *  11/1999    Jovanovic .......... H02M 1/4258
                                                  363/132
(Continued)

FOREIGN PATENT DOCUMENTS

CN    1685596 A    10/2005    ............ H02M 3/335
CN    101155448 A    4/2008    ............ H05B 33/08
(Continued)

OTHER PUBLICATIONS

Linear Technology Corporation, "LTC3806 Synchronous Flyback DC/DC Controller," 20 pages, 2004.
(Continued)

*Primary Examiner* — Nguyen Tran
*Assistant Examiner* — Monica Mata
(74) *Attorney, Agent, or Firm* — Slayden Grubert Beard PLLC

(57) ABSTRACT

A switching circuit including a transformer having a primary and a secondary side; a first MOSFET switch coupled with the primary side; a primary current sensing device; a second MOSFET switch coupled with the secondary side; a secondary current sensing device; and a control circuit for driving the first and second MOSFET switches, wherein first and second switch are complementarily driven and wherein switching of the first and second MOSFET switches is controlled by the primary and secondary current sensing devices.

19 Claims, 4 Drawing Sheets

(52) U.S. Cl.
CPC .... *H02M 2001/0058* (2013.01); *Y02B 20/346* (2013.01); *Y02B 70/1433* (2013.01); *Y02B 70/1475* (2013.01); *Y02B 70/1491* (2013.01)

(56) References Cited

U.S. PATENT DOCUMENTS

| | | | |
|---|---|---|---|
| 6,594,161 B2 | 7/2003 | Jansen et al. | 363/21.14 |
| 6,671,189 B2 | 12/2003 | Jansen et al. | 363/21.14 |
| 6,788,555 B2 | 9/2004 | Bourdillon et al. | 363/21.14 |
| 7,902,771 B2 | 3/2011 | Shteynberg et al. | 315/307 |
| 8,023,291 B2 | 9/2011 | Sato | 363/21.14 |
| 8,067,898 B2 | 11/2011 | Radermacher et al. | 315/291 |
| 8,952,632 B2 | 2/2015 | Du et al. | 315/308 |
| 9,035,566 B2 | 5/2015 | Du et al. | 315/291 |
| 2003/0086280 A1 | 5/2003 | Bourdillon | 363/21.12 |
| 2005/0007086 A1 | 1/2005 | Morimoto | 323/282 |
| 2005/0122747 A1 | 6/2005 | Gaksch | 363/24 |
| 2005/0152158 A1 | 7/2005 | Gut et al. | 363/16 |
| 2005/0194952 A1 | 9/2005 | Carpenter et al. | 323/283 |
| 2005/0213352 A1* | 9/2005 | Lys | F21S 48/325 363/17 |
| 2005/0257647 A1 | 11/2005 | Baker | 81/57.39 |
| 2006/0018135 A1 | 1/2006 | Yang et al. | 363/21.14 |
| 2006/0170373 A1 | 8/2006 | Yang | 315/209 R |
| 2007/0096704 A1 | 5/2007 | Jain et al. | 323/282 |
| 2007/0159151 A1 | 7/2007 | Katoh et al. | 323/285 |
| 2008/0018261 A1 | 1/2008 | Kastner | 315/192 |
| 2008/0088248 A1 | 4/2008 | Myers | 315/210 |
| 2008/0180078 A1 | 7/2008 | Hiasa | 323/282 |
| 2008/0224636 A1 | 9/2008 | Melanson | 315/307 |
| 2009/0296425 A1* | 12/2009 | Lhermite | H02M 3/33507 363/21.04 |
| 2010/0110732 A1 | 5/2010 | Moyer et al. | 363/19 |
| 2010/0283322 A1 | 11/2010 | Wibben | 307/31 |
| 2010/0301761 A1 | 12/2010 | Liao et al. | 315/186 |
| 2010/0308733 A1* | 12/2010 | Shao | H02M 1/4225 315/119 |
| 2010/0315840 A1* | 12/2010 | Cohen | H02M 3/33507 363/21.04 |
| 2011/0057960 A1 | 3/2011 | Kim et al. | 345/690 |
| 2011/0193481 A1* | 8/2011 | Nakamura | H05B 41/2882 315/82 |
| 2012/0025722 A1 | 2/2012 | Mokry et al. | 315/187 |

FOREIGN PATENT DOCUMENTS

| | | | |
|---|---|---|---|
| CN | 201115609 Y | 9/2008 | A47J 27/21 |
| CN | 101523982 A | 9/2009 | H05B 33/08 |
| CN | 101582636 A | 11/2009 | G01R 19/00 |
| CN | 101848577 A | 9/2010 | H05B 37/02 |
| EP | 1538734 A2 | 6/2005 | H02M 3/335 |
| EP | 2296439 A1 | 3/2011 | H05B 33/08 |
| GB | 2435406 A | 8/2007 | A47J 27/21 |
| TW | 571497 B | 1/2004 | H02M 3/28 |
| TW | 200838358 A | 9/2008 | H05B 37/02 |
| WO | 2004/015850 A1 | 2/2004 | H02M 3/335 |
| WO | 2007/055519 A1 | 5/2007 | H03K 7/08 |

OTHER PUBLICATIONS

Cypress Semiconductor, "PowerPSoC Intelligent LED Driver," 53 pages, Sep. 17, 2009.
International Search Report and Written Opinion, Application No. PCT/US2013/062193, 11 pages, dated Jun. 2, 2014.
International Search Report and Written Opinion, Application No. PCT/US2012/064447, 13 pages, dated Oct. 14, 2013.
Chinese Office Action, Application No. 201280066405.4, 8 pages, dated Jan. 28, 2016.
Taiwan Office Action, Application No. 101141908, 9 pages, dated Jan. 19, 2016.
United States Non-Final Office Action, U.S. Appl. No. 13/671,953, 19 pages, dated Aug. 26, 2016.
European Office Action, Application No. 12808540.4, 7 pages, dated Aug. 1, 2016.
Chinese Office Action, Application No. 201280066405.4, 18 pages, dated Oct. 9, 2016.
Chinese Office Action, Application No. 201380051181.4, 8 pages, dated Nov. 2, 2016.
Taiwan Office Action, Application No. 102135168, 5 pages, dated Dec. 22, 2016.
United States Notice of Allowance, U.S. Appl. No. 13/671,953, 11 pages, dated Jan. 26, 2017.
Chinese Office Action, Application No. 201280066405.4, 8 pages, dated Mar. 20, 2017.
Japanese Office Action, Application No. 2015534742, 11 pages, dated Nov. 24, 2017.

* cited by examiner

SOFT SWITCHING SYNCHRONOUS QUASI RESONANT CONVERTER

CROSS REFERENCE TO RELATED APPLICATIONS

In some embodiments, the sensing of the current of the primary switch and the sensing of the current of the secondary switch is accomplished using shunt resistors coupled between a ground and the respective primary or secondary switch. In some embodiments, the method further includes comprising amplifying a current of the secondary switch. In some embodiments, driving said primary and secondary switch includes driving said primary and secondary switch using a pulse width modulator.

TECHNICAL FIELD

The present disclosure relates to switched mode power supplies, in particular to drive a load, and more particular to driving and dimming of light emitting diodes (LEDs).

BACKGROUND

A switch mode power supply (SMPS) is used to provide a constant voltage to a load via a low pass filter and using a semiconductor device such as a power transistor (e.g., a MOSFET) as a switch. The semiconductor switches used to implement switch mode power supplies are continuously switched on and off at high frequencies (50 kHz to several MHz), to transfer electrical energy from the input to the output through the passive components.

The efficiency of high input voltage power supplies is limited by the switching losses of the primary MOSFET. Switching losses become the dominant loss for high input voltage applications (automotive, a/c, industrial, etc.).

In addition, high frequency switches produce substantial electromagnetic interference (EMI), which is increasingly the subject of governmental regulation.

SUMMARY

According to an embodiment, a switching circuit may comprise a transformer having a primary and a secondary side; a first MOSFET switch coupled with the primary side; a primary current sensing device; a second MOSFET switch coupled with the secondary side; a secondary current sensing device; and a control circuit for driving the first and second MOSFET switches, wherein first and second switch are complementarily driven and wherein switching of the first and second MOSFET switches is controlled by the primary and secondary current sensing devices.

According to a further embodiment, the primary and secondary current sensing devices may each comprise a shunt resistor coupled between a ground and the respective first or second MOSFET switch. According to a further embodiment, the switching circuit may further comprise a current sensing amplifier coupled to the secondary current sensing device. According to a further embodiment, the switching circuit may further comprise a comparator receiving first and second current sensing signals and having an output coupled with the control circuit. According to a further embodiment, the control circuit may comprise a pulse width modulator. A power supply circuit according to embodiments includes a control circuit; and a quasi-resonant flyback circuit including: a primary circuit controlled by a first transistor switch and including a first current sensing device; a secondary circuit controlled by a second transistor switch and including a second current sensing device; and a transformer having a primary and a secondary side; wherein the control circuit is configured to drive said first transistor switch and said second transistor switch, wherein said first transistor switch and said second transistor switch are complementarily driven and wherein switching of said first transistor switch and said second transistor switch is controlled via the first and second current sensing devices.

In some embodiments, the primary and secondary current sensing devices each comprise a shunt resistor coupled between a ground and the respective first or second transistor switch. In some embodiments, the circuit further includes a current sensing amplifier coupled to the second current sensing device. In some embodiments, the circuit includes a comparator receiving first and second current sensing signals and having an output coupled with the control circuit. In some embodiments, the control circuit includes a pulse width modulator.

A method according to embodiments includes charging an output capacitor through a flyback transformer with a primary switch, the flyback transformer and the primary switch coupled to a power source; discharging the output capacitor through the flyback transformer with a secondary switch, the flyback transformer and the secondary switch being coupled to the output capacitor; sensing a current of the primary switch; sensing a current of the secondary switch; and driving said primary switch and said secondary switch, wherein said primary switch and said secondary switch are complementarily driven and wherein switching of said primary switch and said secondary switch is controlled responsive to sensing the current of the primary switch and the secondary switch.

In some embodiments, the sensing of the current of the primary switch and the sensing of the current of the secondary switch is accomplished using shunt resistors coupled between a ground and the respective primary or secondary switch. In some embodiments, the method further includes comprising amplifying a current of the secondary switch. In some embodiments, driving said primary and secondary switch includes driving said primary and secondary switch suing a pulse width modulator.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

According to various embodiments, a device for controlling a load has synchronous capability for voltage positioning. Zero voltage switching is provided by controlling the reverse current using the device, thereby increasing device efficiency and reducing EMI.

More particularly, a switched mode power supply (SMPS) architecture may use a synchronous SMPS design to reposition voltage for dimming LED's. According to various embodiments, the synchronous switch according to such an architecture is used to load the magnetic device and use the reverse energy to soft switch the MOSFET. Soft switching the MOSFET significantly increases efficiency and reduces EMI.

Figure 1:
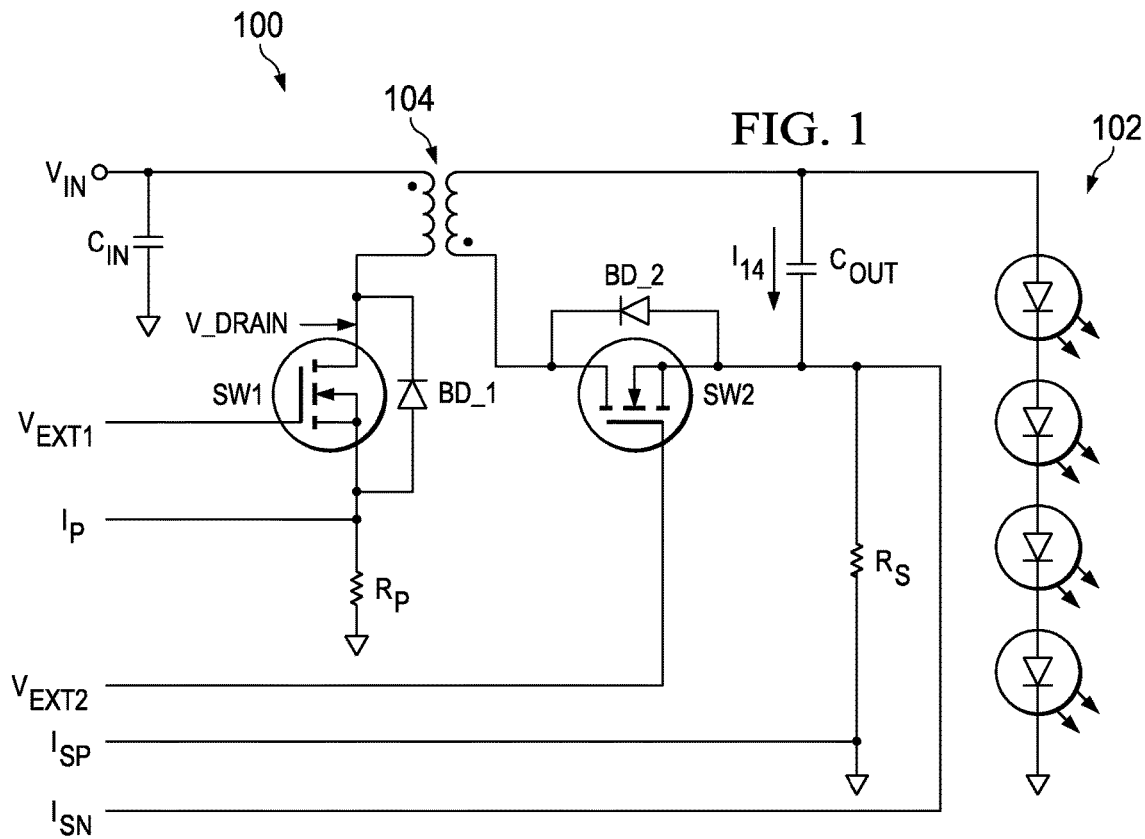
FIG. 1 shows a circuit diagram for high voltage LED driving.

Shown in FIG. 1 is a SMPS 100 driving a load 102 which may be embodied as a plurality of light emitting diodes (LED). The circuit 100 includes a pair of MOSFET switches SW1, SW2, respectively, flyback transformer 104, output capacitor Cout, and sense resistors Rp, Rs for sensing the current at the outputs of SW1, SW2, respectively.

In normal Quasi-Resonant mode, the primary switch SW1 is turned on after detecting the ringing waveform on the drain of SW1. The ring on SW1 is caused by the demagnetization of the flyback transformer 104 due to the lack of magnetizing current clamping the secondary winding to Vout through the body diode of SW2 (BD_2).

SW2 provides a path for current to flow in the "normal" direction charging $C_{OUT}$. In this case, when the energy in the core reaches zero, SW2 provides a path for $C_{OUT}$ to drive the core in the reverse direction (reverse current). This energy stored can be used to reset or clamp the SW2 drain voltage to 0 V or a diode drop below Ground by operating the flyback transformer 104 in the reverse direction. This forces soft switching of the SW1 switch, eliminating switching losses and significantly reducing the EMI caused by high dv/dt due to MOSFET's switching voltage (hard switching).

Figure 2:
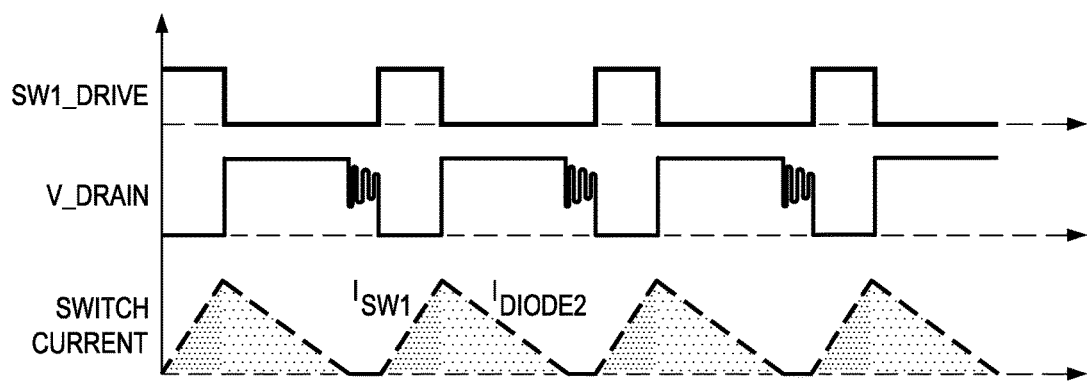
FIG. 2 shows timing diagrams for normal quasi-resonant mode.

FIG. 2 illustrates exemplary waveforms for the circuit of FIG. 1. SW1_Drive (representing Vext of FIG. 1) drives SW1 to turn on after the ringing on V_Drain is detected. $I_{SW1}$ corresponds to $I_P$ or primary current (FIG. 1). Diode 2 current, $I_{DIODE2}$, corresponds to $I_{SN}$ or secondary current (FIG. 1).

The circuit of FIG. 1 thus forms a quasi-resonant flyback converter. As will be discussed in greater detail below, embodiments implement a synchronous quasi-resonant circuit. Generally, high voltage topologies do not benefit from such synchronous operation. Forcing reverse current and turning SW2 off at the right time is not trivial, requires respective current sense and fast, low offset comparator(s).

Figure 3:
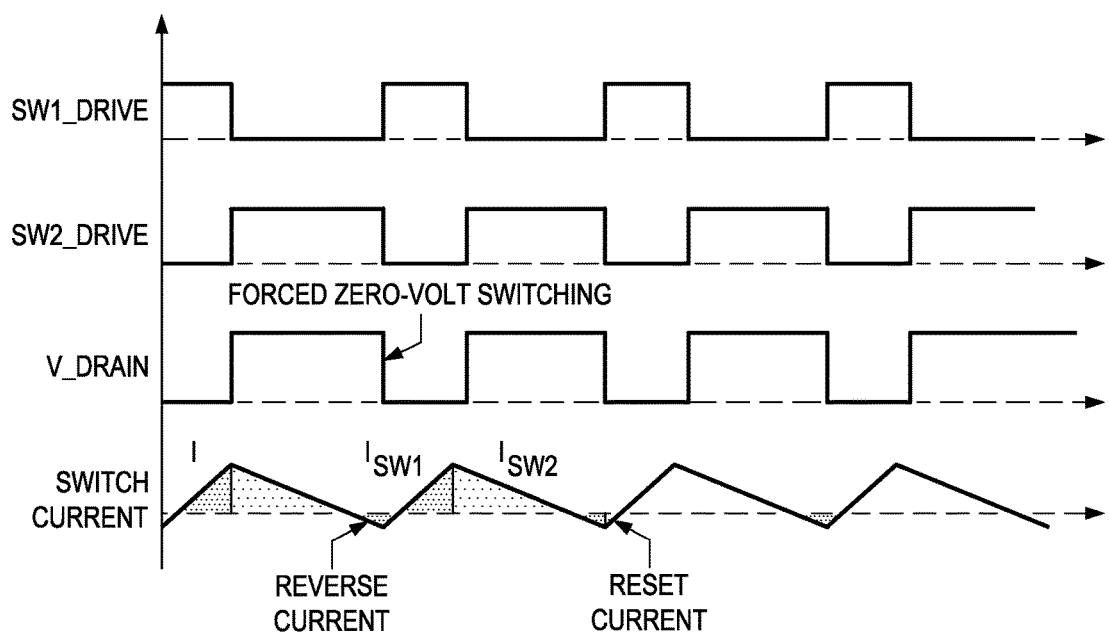
FIG. 3 shows waveforms for synchronous quasi-resonant mode.

According to various embodiments, a synchronous dimming method is used for zero volt switching. The synchronous switch is added to position the output voltage for LED dimming. The method is further used to generate a "square" wave current driver for multiple LED strings. The synchronous switch is used to reverse energy from stored output capacitor. The stored energy is used to discharge the capacitance on the primary FET. This results in zero voltage switching, as shown in FIG. 3.

This various embodiments work for variable frequency converters with bi-directional or synchronous capability. High input voltage, low to medium power applications receive the most benefit. Many synchronous topologies can benefit from this concept (fly back, boost, SEPIC, Cuk, etc.).

Figure 4:
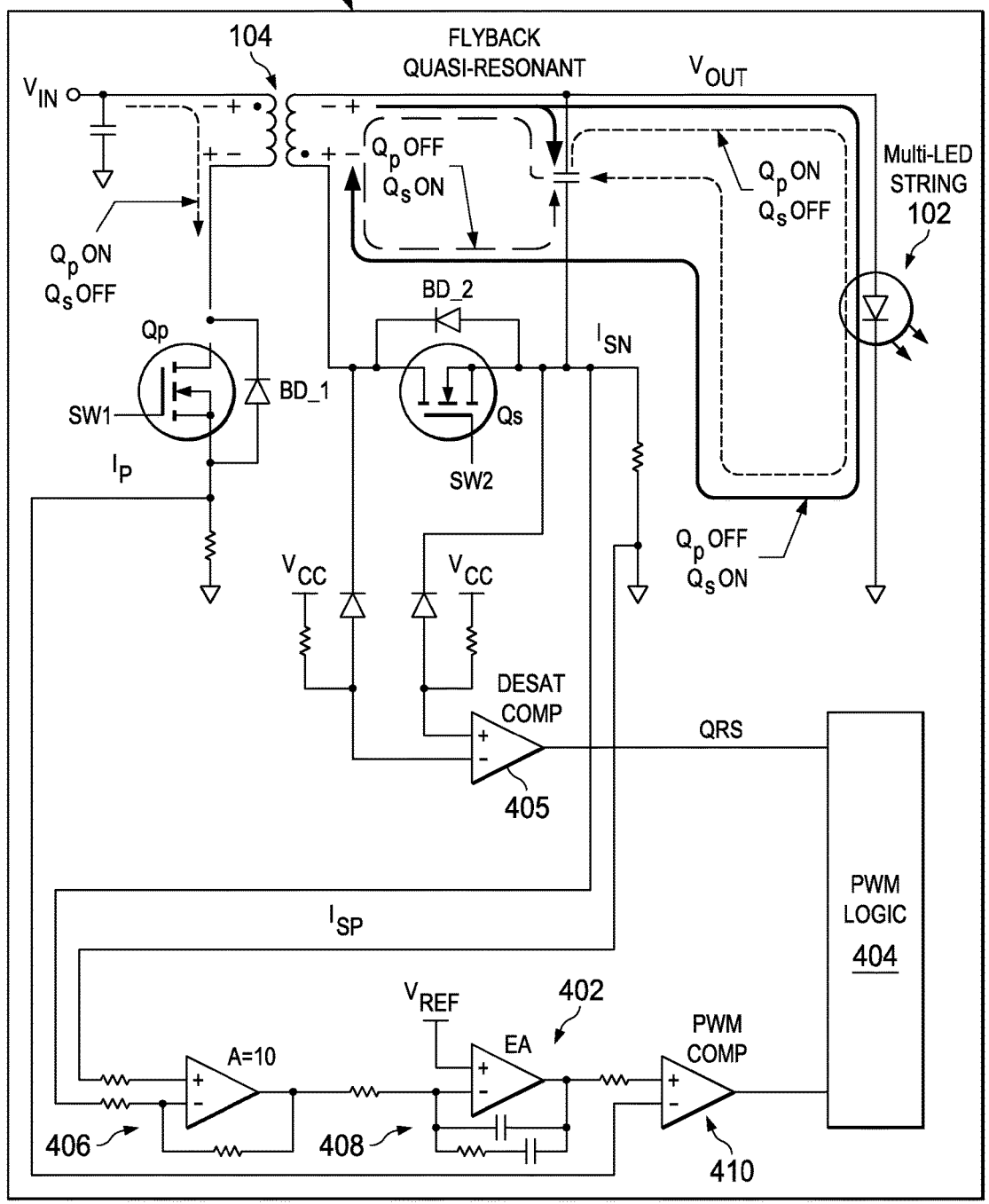
FIG. 4 shows more details of a quasi resonant zero volt switching flyback topology.

A more detailed circuit of the embodiment shown in FIG. 1, in particular with respect to the current sensing is shown in FIG. 4.

Shown are a primary circuit including transistor Qp and a secondary circuit including transistor Qs, flyback transformer 104, output capacitor Cout, and sense resistors Rp, Rs for sensing the current at the outputs of SW1 (Qp), SW2 (Qs), respectively. As shown, current sensing for the primary ($I_P$) and secondary circuit ($I_S$) are compared and a resulting control signal is fed to a pulse width modulator PWM 404. The PWM logic then provides the $V_{SW1}$ and $V_{SW2}$ control drive voltages.

In the embodiment illustrated, the current Ip from Qp is provided to comparator 410. Current $I_S$ from Qs is provided to amplifier filter circuitry 402 including amplifiers 406 and 408 Amplier circuit 406 is used to gain the current sense signal since low value resistors are used to keep efficiency high. Amplifier 408 is used to regulate the LED current using a traditional error amplifier, $V_{REF}$ and feedback signal from amplifier 406.

In addition, a desat comparator 405 may provide a QRS output to the PWM 404 for detecting zero transformer energy (i.e., used to reverse current for output voltage positioning/zero volt switching).

Normal current flow during the switching cycles is indicated in FIG. 4 within the circuit. When SW1 (Qp) is on, current flows through transformer winding 104 through the transistor Qp. The current Ip is received as an input to comparator 410. The capacitor Cout discharges and activates the load 102. If SW2 is left on after the coupled inductor energy reaches zero, the coupled inductor stores energy in the reverse direction. Its energy comes from the output cap $C_{OUT}$.

Figure 5:
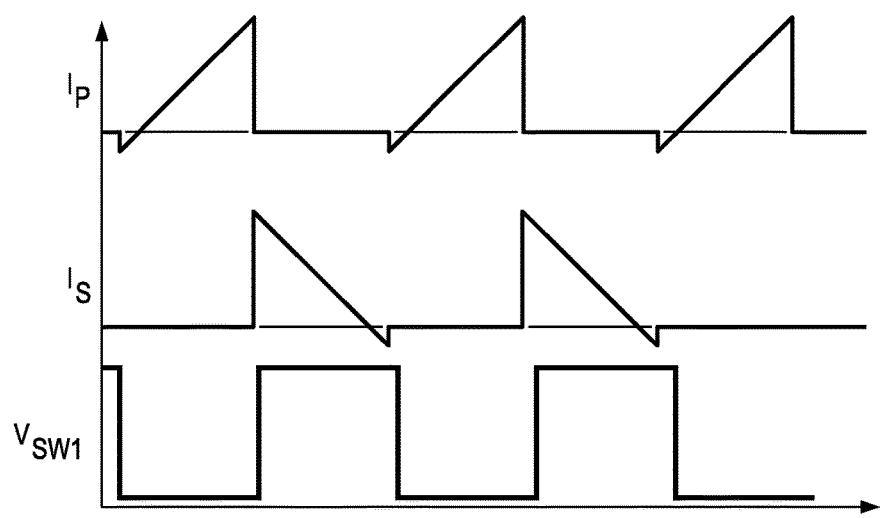
FIG. 5 shows waveforms associated with the circuit diagram of FIG. 4.

FIG. 5 illustrates current flow according to the embodiment of FIG. 4. As shown, the $Vsw_1$ drive controls the SW1 and switchover from Ip to Is. The PDRV (primary transistor drive signal) (FIG. 6) is used to store energy in transformer 104 while switch Qp is turned "ON". During this time primary current flows through sense resistor Rp. Once the desired primary peak current is reached PDRV turns off Qp and SDRV (secondary transistor drive signal) (FIG. 6) turns "ON" Qs. During this time transformer 104 provides current to the LED's and replenishes the charge into COUT. Zero transformer energy is detected when the desaturation comparator 405 (FIG. 4) inputs desat+ and desat− have a 0 V differential. Additional offset or delay can be added to "reverse" current into transformer 104 allowing the current to reverse through the synchronous switch. This stored energy is used to force current flow through the body diode of Qp after Qs turn off resulting in 0V across switch Qp. The PDRV signal turns Qp on after the switch drain source voltage has reached 0V eliminating switching losses and reducing EMI. The cycle repeats itself when Qp turns on until the desired peak current is reached.

Note: The desired peak current is reached when the comp 410 non-inverting current ramp signal exceeds the inverting comp 410 input. This is the regulation loop for LED current, independent of the quasi-resonant comparator operation.

Figure 6:
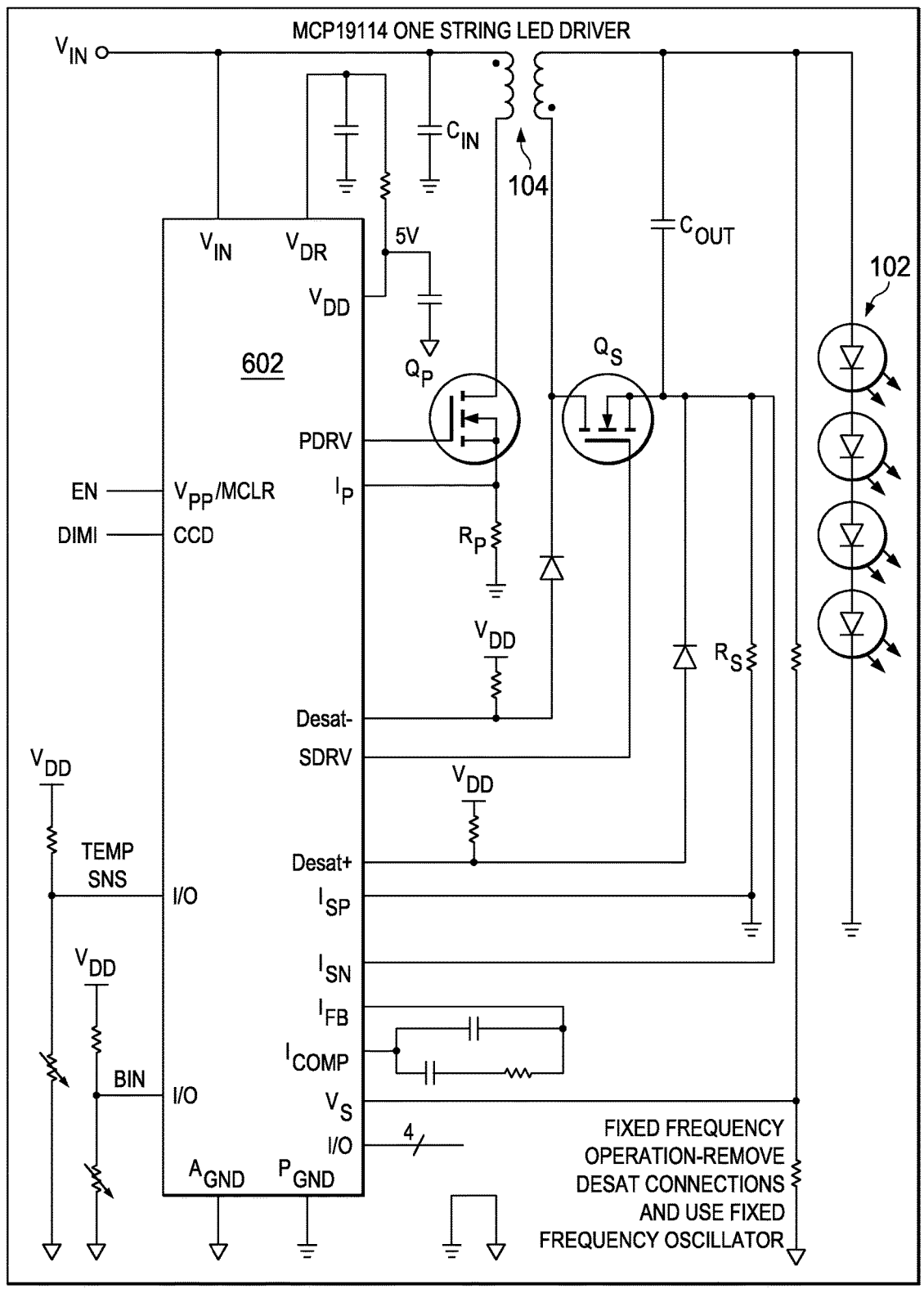
FIG. 6 shows a schematic diagram for zero volt switching according to an embodiment.

Finally, FIG. 6 illustrates an exemplary implementation of a flyback quasi resonant circuit. As shown, the function of the circuitry 402 and the PWM logic may be implemented in an integrated circuit.

The various embodiments provide for the following benefits of quasi resonant synchronous zero volt switching operation: Switching losses are eliminated, wherein largest impact is on AC-DC or very high voltage input designs. EMI is significantly reduced, because even zero current switching topologies introduce some noise.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary.

While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, process, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

What is claimed is:

1. A switching circuit comprising:
   a transformer having a primary and a secondary winding wherein the secondary winding is coupled with a load;
   a first MOSFET switch coupled with the primary winding;
   a primary current sensing device configured to measure a current at an output of the first MOSFET;

a second MOSFET switch coupled in series with the secondary winding;

a secondary current sensing device coupled in series with the second MOSFET configured to measure a current at an output of the second MOSFET;

a control circuit for driving said first MOSFET switch and said second MOSFET switch, wherein a driving signal of said first MOSFET switch is inverse to a driving signal of said second MOSFET switch; and a comparator having a first input, a second input and an output, wherein a signal from the first current sensing device is fed to the first input and a signal from the second current sensing device is fed to the second input and a resulting output signal from said output of said comparator is fed to a pulse width modulator generating the driving signals for said first MOSFET switch and said second MOSFET switch.

2. The switching circuit according to claim 1, wherein the primary and secondary current sensing devices each comprise a shunt resistor coupled between a ground and the respective first or second MOSFET switch.

3. The switching circuit according to claim 2, further comprising a current sensing amplifier coupled to the secondary current sensing device.

4. The switching circuit according to claim 3, wherein the control circuit comprises a pulse width modulator.

5. A power supply circuit comprising:
a control circuit; and
a quasi-resonant flyback circuit including:
    a primary circuit controlled by a first transistor switch and including a first current sensing device;
    a secondary circuit controlled by a second transistor switch and including a second current sensing device coupled in series with the second transistor; and
    a transformer having a primary and a secondary winding, wherein the primary winding is coupled with the first transistor switch and the secondary winding is coupled in series with the second transistor and with a load;
wherein the control circuit is configured to drive said first transistor switch and said second transistor switch, wherein a driving signal for said first transistor switch is inverse with respect to a driving signal for said second transistor switch and wherein signals from the first and second current sensing devices are fed to a comparator and compared with each other and a resulting output signal of the comparator is fed to a pulse width modulator generating the driving signals for said first transistor switch and said second transistor switch.

6. The power supply circuit according to claim 5, wherein the primary and secondary current sensing devices each comprise a shunt resistor coupled between a ground and the respective first or second transistor switch.

7. The power supply circuit according to claim 6, further comprising a current sensing amplifier coupled to the second current sensing device.

8. The power supply circuit according to claim 7, wherein the control circuit comprises a pulse width modulator.

9. A method, comprising:
charging an output capacitor through a secondary winding of a flyback transformer with a primary switch, wherein a primary winding of the flyback transformer and the primary switch are coupled to a power source;
discharging the output capacitor through a secondary winding of the flyback transformer with a secondary switch into a load, the secondary winding of the flyback transformer and the secondary switch being coupled to the output capacitor and the load;
sensing a current of the primary switch;
sensing a current of the secondary switch;
comparing a first current sense signal with a second current sense signal and feeding a resulting control signal to a pulse width modulator generating driving signals for said primary switch and said secondary switch; and
driving said primary switch and said secondary switch with said driving signals, wherein a driving signal for said primary switch is inverse to a driving signal for said secondary switch.

10. The method according to claim 9, wherein the sensing of the current of the primary switch and the sensing of the current of the secondary switch is accomplished using shunt resistors coupled between a ground and the respective primary or secondary switch.

11. The method according to claim 10, further comprising amplifying a current of the secondary switch.

12. The method according to claim 11, further wherein driving said primary and secondary switch comprises driving said primary and secondary switch using a pulse width modulator.

13. The method according to claim 9, wherein the secondary winding of the flyback transformer drives a multi-LED string forming the load.

14. The switching circuit according to claim 3, wherein the current sensing amplifier comprises a gain amplifier followed by an error amplifier.

15. The switching circuit according to claim 4, further comprising a comparator comparing voltages at a drain and source of the second MOSFET switch and forwarding an output signal to the pulse width modulator.

16. The power supply circuit according to claim 5, wherein the current sensing amplifier comprises a gain amplifier followed by an error amplifier.

17. The power supply circuit according to claim 8, further comprising a comparator comparing voltages at a drain and source of the second MOSFET switch and forwarding an output signal to the pulse width modulator.

18. A circuit arrangement comprising a power supply circuit according to claim 5, wherein the secondary winding provides power for the load.

19. The circuit arrangement according to claim 18, wherein the load is a multi-LED string.

* * * * *